US012453988B2

(12) United States Patent
Haugen et al.

(10) Patent No.: US 12,453,988 B2
(45) Date of Patent: Oct. 28, 2025

(54) SYSTEM AND METHOD TO CLEAN A RANGE EXHAUST

(71) Applicant: Restaurant Technologies, Inc., Mendota Heights, MN (US)

(72) Inventors: Kyle Haugen, Eagan, MN (US); Jason Platz, Mendota Heights, MN (US)

(73) Assignee: Restaurant Technologies, Inc., Mendota Heights, MN (US)

( * ) Notice: Subject to any disclaimer, the term of this patent is extended or adjusted under 35 U.S.C. 154(b) by 0 days.

(21) Appl. No.: 18/096,745

(22) Filed: Jan. 13, 2023

(65) Prior Publication Data

US 2024/0238847 A1 Jul. 18, 2024

(51) Int. Cl.

| | |
|---|---|
| ***B08B 3/02*** | (2006.01) |
| ***B08B 3/08*** | (2006.01) |
| ***B08B 9/032*** | (2006.01) |
| ***B08B 13/00*** | (2006.01) |
| ***F24C 15/20*** | (2006.01) |

(52) U.S. Cl.

CPC .................. *B08B 3/02* (2013.01); *B08B 3/08* (2013.01); *B08B 9/0325* (2013.01); *B08B 13/00* (2013.01); *F24C 15/2057* (2013.01); *B08B 2203/0217* (2013.01); *B08B 2209/032* (2013.01)

(58) Field of Classification Search

CPC ............ B08B 13/00; B08B 2203/0217; B08B 2209/032; B08B 3/02; B08B 3/08; B08B 9/0325; F24C 15/2057; F24C 15/2021

See application file for complete search history.

(56) References Cited

U.S. PATENT DOCUMENTS

| | | | |
|---|---|---|---|
| 3,805,685 | A | 4/1974 | Carns |
| 5,472,342 | A | 12/1995 | Welsh et al. |
| 6,274,375 | B1 | 8/2001 | Mcminn |
| 6,626,190 | B2 | 9/2003 | Durth et al. |
| 7,963,282 | B2 | 6/2011 | Griffin et al. |
| 9,550,686 | B2 | 1/2017 | Macdougall |
| 10,195,470 | B2 | 2/2019 | Livchak et al. |
| 2005/0109374 | A1 | 5/2005 | Letessier et al. |

(Continued)

FOREIGN PATENT DOCUMENTS

| | | | |
|---|---|---|---|
| CN | 2700741 | Y | 5/2005 |
| CN | 203517943 | U | 4/2014 |

(Continued)

OTHER PUBLICATIONS

Machine translation of EP1775035A (Year: 2007).*

(Continued)

*Primary Examiner* — Douglas Lee

(74) *Attorney, Agent, or Firm* — Dorsey & Whitney LLP

(57) ABSTRACT

An example automatic kitchen cleaning system includes a control box configured to, in response to receipt of the start signal to initiate the first cleaning operation of the cooking range exhaust system, causing the first detergent and water to be mixed in a reservoir at the first target mixing ratio for form the first cleaning solution. The control box is further configured to, in response to receipt of the start signal to initiate the second cleaning operation of the waste conduit, causing the second detergent and water to be mixed in the reservoir at the second target mixing ratio to form the second cleaning solution.

23 Claims, 8 Drawing Sheets

(56) References Cited

U.S. PATENT DOCUMENTS

| | | | | |
|---|---|---|---|---|
| 2011/0214565 | A1* | 9/2011 | Kwok | B01D 45/08 95/267 |
| 2013/0074823 | A1* | 3/2013 | Kellogg | F24C 15/2057 134/34 |
| 2014/0076367 | A1 | 3/2014 | Hung | |
| 2016/0030782 | A1 | 2/2016 | Livchak et al. | |
| 2017/0008044 | A1 | 1/2017 | Okumura et al. | |
| 2018/0304316 | A1 | 10/2018 | Khandjian et al. | |
| 2019/0390859 | A1 | 12/2019 | Lambertson | |
| 2022/0008968 | A1 | 1/2022 | Haugen et al. | |
| 2022/0324000 | A1 | 10/2022 | Shingler | |
| 2024/0116091 | A1 | 4/2024 | Haugen et al. | |

FOREIGN PATENT DOCUMENTS

| | | | | |
|---|---|---|---|---|
| CN | 204757065 | U | 11/2015 | |
| CN | 108870485 | A | 11/2018 | |
| CN | 113145517 | A | 7/2021 | |
| CN | 113237113 | A | 8/2021 | |
| EP | 1775035 | A1 * | 4/2007 | B08B 15/02 |
| FR | 2915409 | A1 | 10/2008 | |
| GB | 2604887 | A * | 9/2022 | B08B 9/027 |
| WO | WO-2017005659 | A1 * | 1/2017 | B08B 9/0327 |
| WO | 2018129619 | A1 | 7/2018 | |
| WO | 2019075991 | A1 | 4/2019 | |

OTHER PUBLICATIONS

International Search Report and Written Opinion dated Mar. 22, 2024 in connection with International Patent Application No. PCT/US2024/010813, 14 pages.

Asmuin, Norzelawati et al. "Simulation of water mist spray for commercial kitchen ventilation (CKV) system using Asys-CFD," Applied Mechanics and Materials vol. 660, 2014, pp. 704-708.

International Search Report and Written Opinion dated Jan. 16, 2025 in connection with International Patent Application No. PCT/US2024/053899, 12 pages.

International Search Report and Written Opinion dated Jan. 17, 2024 in connection with International Patent Application No. PCT/US2024/053903, 21 pages.

* cited by examiner

SYSTEM AND METHOD TO CLEAN A RANGE EXHAUST

BACKGROUND

Cooking ranges may have various types of exhaust systems (e.g., hood, backsplash, flue, connecting pipes or conduit, etc.) designed to exhaust cooking effluent (e.g., smoke, odors, grease, other types of cooking effluent, etc.) away from the cooking range. Over time, grease and other particles that are entrained in the exhaust effluent may be deposited on the surfaces of the exhaust system to form a film. This film may present a fire hazard, as it contains grease and other flammable materials from the cooking effluent. Manually scheduling cleaning of the film from the exhaust systems can lead to overcleaning, which may lead to waste, or undercleaning, which may lead to the aforementioned hazards.

DETAILED DESCRIPTION

Figure 1A:
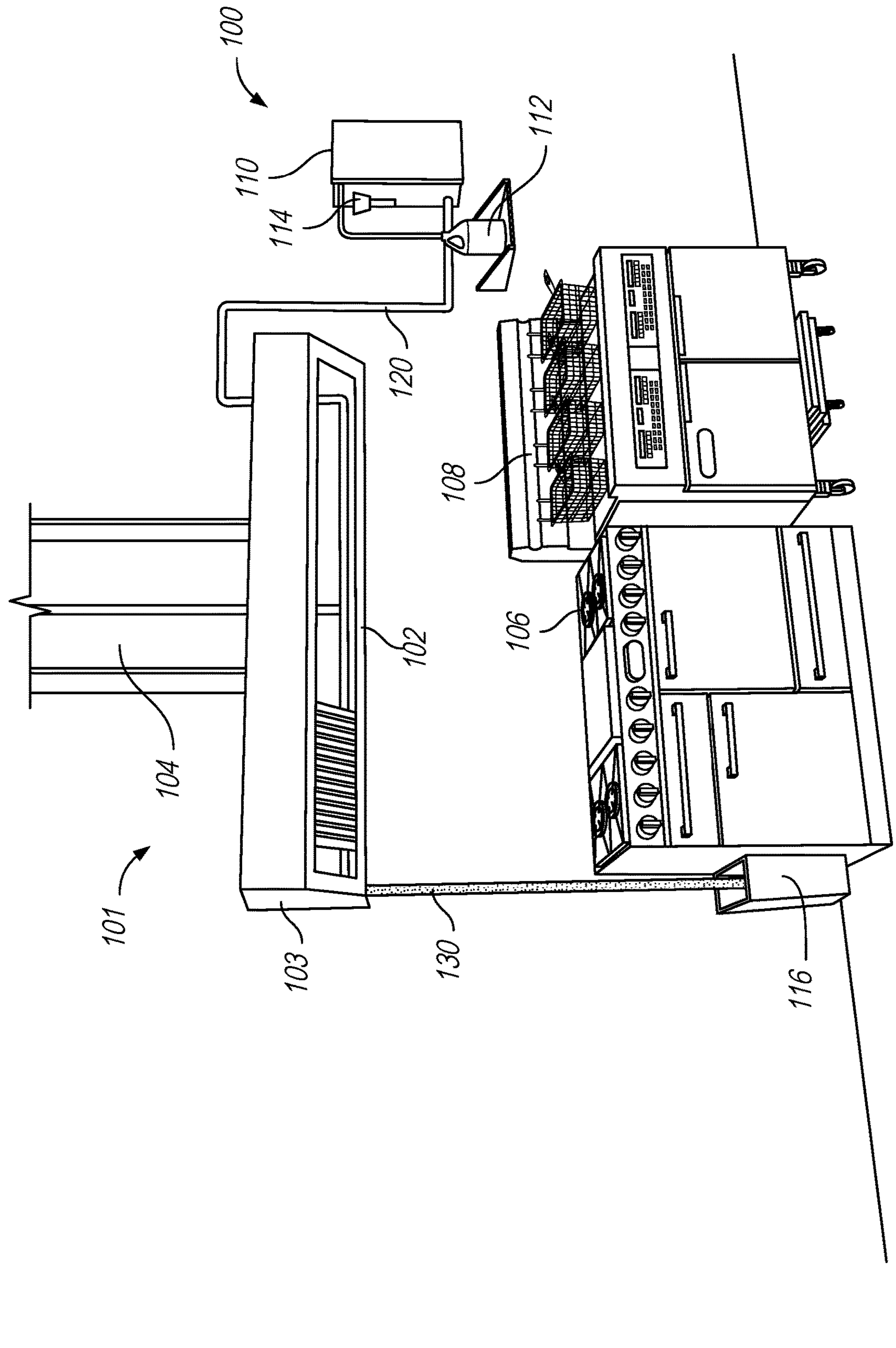
FIGS. 1A-1C depict a diagrams illustrating an exemplary automated range exhaust cleaning system configured to clean deposited film from surfaces of a cooking range exhaust system in accordance with embodiments of the disclosure.

Certain details are set forth below to provide a sufficient understanding of embodiments of the disclosure. It will be clear to one skilled in the art, however, that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

This disclosure describes embodiments of an automated cooking range exhaust cleaning system (system) that may be configured to automatically clean the film from a cooking range exhaust system, as well as clean waste conduit and/or drain lines. As part of the cleaning process, the system may apply a selected degreasing solution or detergent.

In some embodiments, the automated cooking range exhaust cleaning system includes a spray system with conduit and nozzles disposed in the cooking range exhaust system and arranged to spray surfaces with a detergent solution and/or water. The spray or flush system may be divided into zones that are each independently activated or controlled.

The system may further include a control box that is configured to control operation of the spray system, including cleaning operation parameters or configurations for individual zones. The control box may control, on a zone-by-zone basis, scheduling cleaning operations (e.g., frequency and times), a duration of a cleaning cycle, a detergent or combination of detergents, a mixing ratio of the selected detergent or combination of detergents, number of spray or flush cycles per cleaning operation, duration of individual spray or flush cycles. In some examples, the control box may include a wireless interface (e.g., Wi-Fi, Bluetooth, etc.) for providing cleaning operation data, completed or missed cleaning cycles, receiving configuration settings, providing status information (e.g., online or offline, faults or errors, etc.), etc., or any combination thereof. The control box may interface with an electronic device (e.g., a smartphone, tablet, any other computing or electronic device, etc.) via the wireless interface. Additionally or alternatively, the control box may include a wired interface for providing cleaning operation data, completed or missed cleaning cycles, receiving configuration settings, providing status information (e.g., online or offline, faults or errors, etc.), etc., or any combination thereof. Thus, the wireless and/or wired interface may facilitate configuration of the control box to control operation of the automated range cleaning system according to specified settings.

The control box may control output devices, such as switches, solenoids, water and detergent pumps, valves, etc. The control box may further monitor various input devices, such as timing sensors, timers, cancel/abort input signals, etc. In some examples, the control box may include a microcontroller and a memory that is programmed with instructions to control or perform methods or operation described herein. In some examples, the control box includes a programmable logic controller (PLC) configured to be programmed to control or perform methods or operations described herein.

In some examples, the control box may monitor one or more float switches from a set of float switches in real time before the cleaning operation to determine how much volume of a detergent or combination of detergents needs to be added by a detergent pump to meet the desired detergent and water mixing ratio. Float switches may be actuated by incoming water from the water supply as it fills a reservoir. The control box may set a different mixing ratio for each individual spray during the cleaning operation.

In other examples, the control box may implement a post-mix operation such that a mixing ratio is controlled via a set of electronically-controlled valves to meter the water supply and the detergent such that they are mixed at the point they enter the conduit according to a target mixing ratio. The control box may control the set of valves to independently select a detergent or combination of detergents and a mixing ratio of the selected detergent or combination of detergents for each individual zone.

In some examples, the control box initiates a cleaning operation on a zone-by-zone basis. In some examples, the control box is limited to causing one zone to be cleaned at a time, with one or more of the zones cleaned sequentially. That is, once a cleaning operation with one zone is complete, the control box may initiate a cleaning operation on a second zone according to a cleaning schedule, and once the cleaning operation for the second zone complete, a cleaning operation for a third zone (if applicable) may be initiated. In other examples, two or more zones may be cleaned contemporaneously. In some examples, two zones with common target detergent-to-water ratios may be cleaned contemporaneously. A determination of a number of zones capable of being cleaned contemporaneously may be based available supply water volume and pressure, pump capacity, duration of the cleaning operation, and cleaning solution (e.g., water and detergent mixture) volume and pressure for selected zones.

The respective cleaning operation for each zone may be individually configured independent of other zones. For example, for a single cleaning operation of a particular zone, the control box may be programmed to specify number of spray cycles, a duration of each spray or flush cycle, a detergent or combination of detergents, a mixing ratio of the selected detergent or combination of detergents and water, a number of and duration of each water rinse spray cycle, or any combination thereof. The control box may be further programmed to specify a schedule for a particular cleaning operation in each zone.

In some examples, the cleaning system may include sensors (e.g., cameras or other sensors capable of detecting the film on the surfaces of the exhaust system. In some examples, the control box may periodically receive data from the sensors indicating a level of film deposit, and may determine whether to schedule a cleaning operation based on the data. In some examples, rather than being purely time-based, the control box may end a cleaning operation in response to data from the sensors indicating that the surfaces of the exhaust system are sufficiently clean. In some examples, the control box may determine whether a completed cleaning operation was successful based on the data from the sensors. In some examples, the control box may provide the sensor data to a backend system to be analyzed and stored.

The control box may be configured to provide data related to operation of the automated cooking range exhaust cleaning system, such as cycles completed, cycle duration, amount of detergent used, sensed film deposit data, etc., or any combination thereof. The information may be stored in a database. The database may also include inspection data that indicates whether the cleaning operations are meeting expected standards. The database may provide alerts if cleaning operations need to be adjusted for not meeting expected standards. The database may also provide alerts if received data indicates that operation of a particular automated cooking range exhaust cleaning system is not as expected, such as missing scheduled cleaning operations, duration of an operation is not as expected, more or less detergent is being used than expected, etc., or any combination thereof.

Figure 1B:
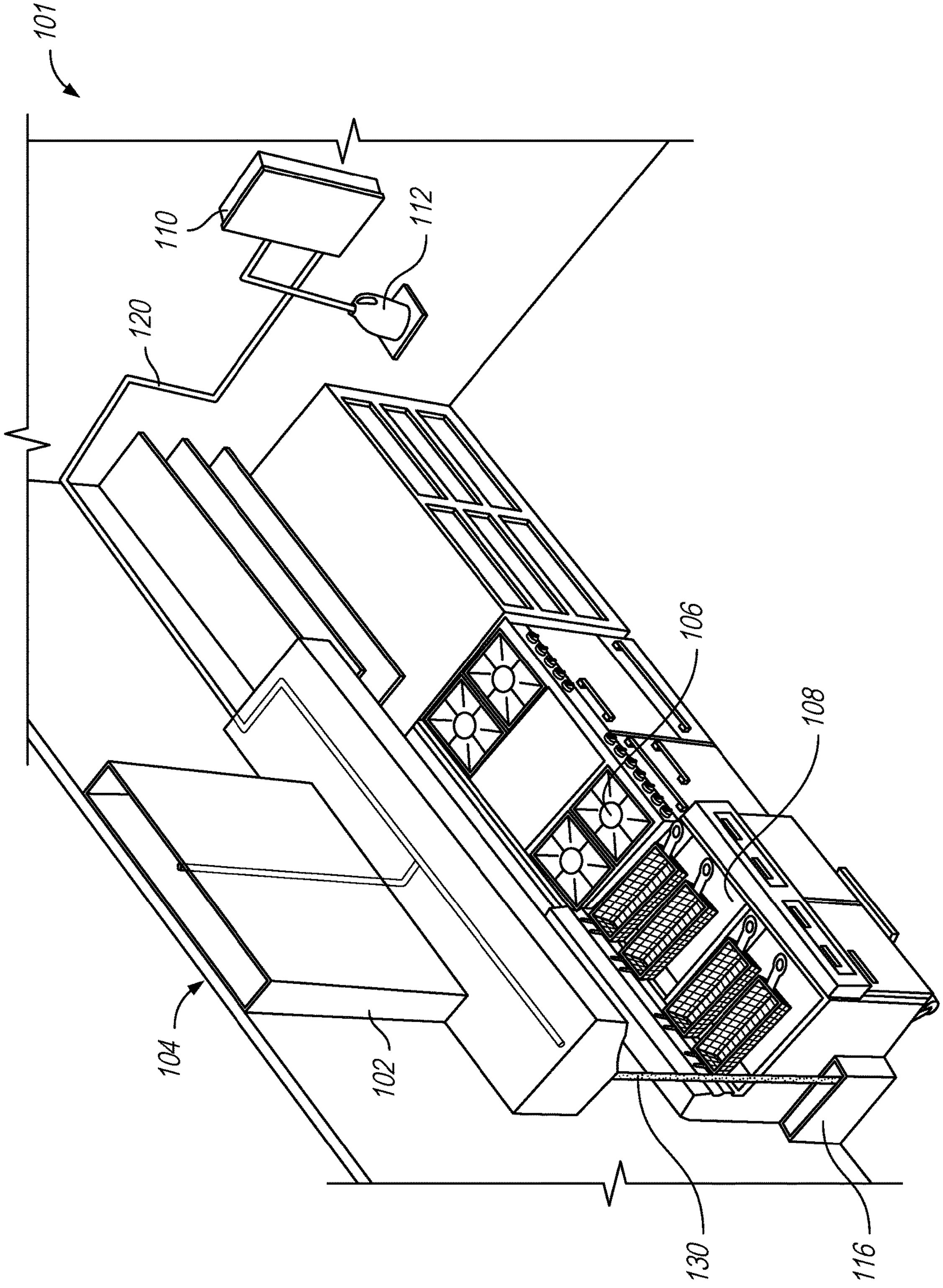
Figure 1C:
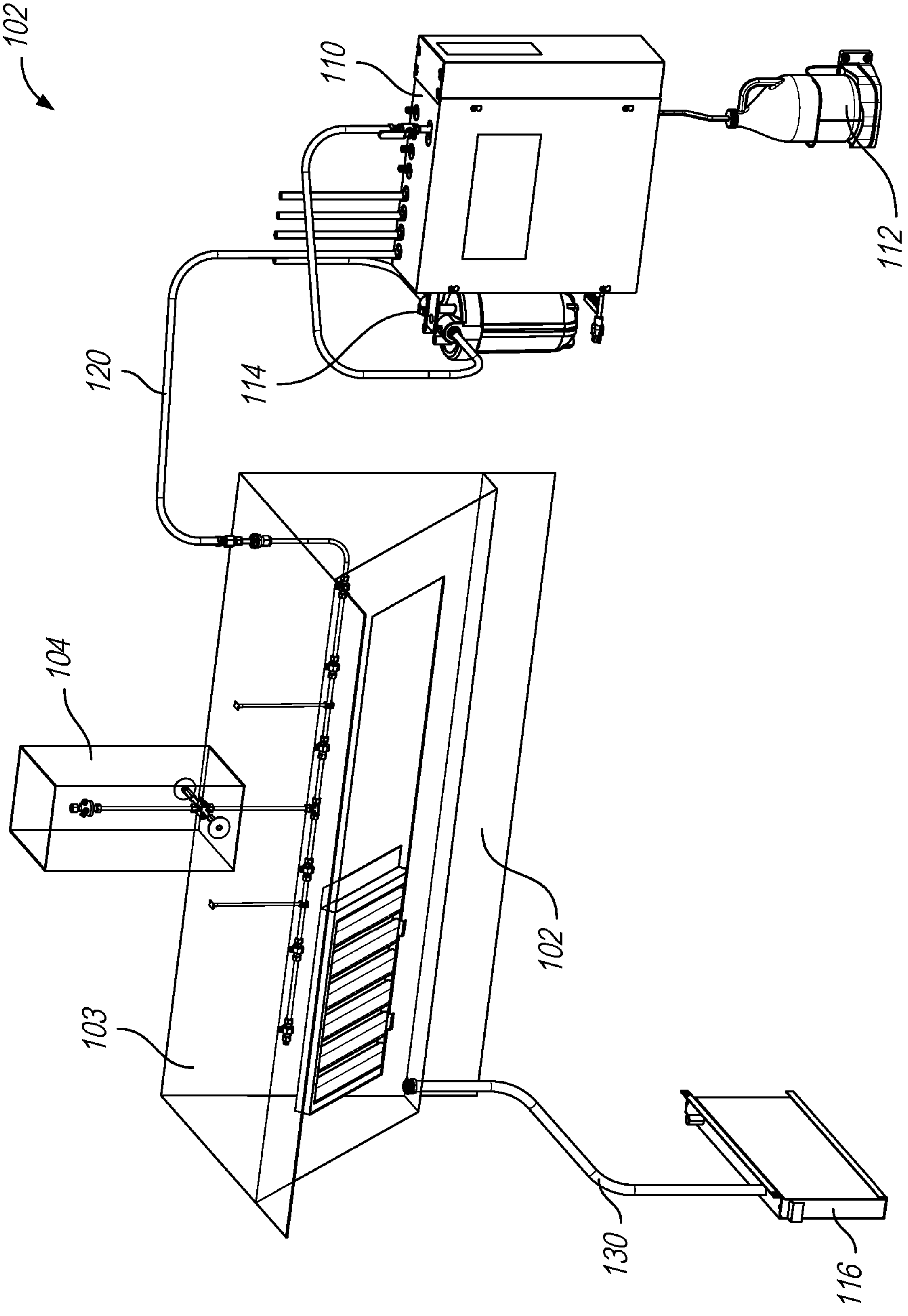

FIGS. 1A-1C depict a diagrams illustrating an exemplary automated range exhaust cleaning system 100 configured to clean deposited film from surfaces of a cooking range exhaust system 101 (e.g., including a backsplash 102, a hood 103, a flue 104, and any connecting pipes or conduit) in accordance with embodiments of the disclosure. The system 100 includes a control box 110, a detergent supply 112, a water supply inlet 114, a waste reservoir 116, and conduit 120. The cooking range exhaust system 101 may remove or exhaust cooking effluent (e.g., smoke, odors, grease, other types of cooking effluent, etc.) away from a cooking range 106 and/or a 108. Over time, grease and other particles that are entrained in the exhaust effluent may be deposited on the surfaces of the backsplash 102, the hood 103, the flue 104, etc. to form a film. The system 100 may be configured to automatically clean the film from the cooking range exhaust system 101, which may include application of a degreasing solution. In some examples, the system 100 is only configured to clean inside surfaces of the cooking range exhaust system 101 (e.g., inside of the hood 103 and the flue 104, but not the outside of the hood 103 or the flue 104, filters; or the backsplash 102).

In some embodiments, the system 100 includes a spray system with conduit 120 disposed in, on, or proximate to parts of the cooking range exhaust system 101, the hood 103 and/or the flue 104, and may be arranged to spray surfaces with a detergent solution and/or water. In some examples, the conduit 120 may include two or more zones of independently activated or controlled groups of nozzles. In some examples, the zones may each have an independent set of pipes. In other examples, the zones may share some pipes with other zones, yet the nozzles are independently activated or controlled.

The control box 110 may be configured to control operation of the system 100, including cleaning operation parameters or configurations for individual zones of the conduit 120. The control box 110 may receive water at a water supply inlet 114. The water supply inlet 114 may include a filter to filter the supply water prior to entering the system 100. The control box 110 may also receive detergent from a detergent supply 112. The control box 110 may be programmed to control, on a zone-by-zone basis, scheduling cleaning operations (e.g., frequency and times), a duration of a cleaning cycle, detergent-to-water ratios, number of spray cycles per cleaning operation, duration of individual spray cycles, or any combination thereof. In some examples, the control box 110 may include a wireless interface (e.g., Wi-Fi, Bluetooth, etc.) for providing cleaning operation data, completed or missed cleaning cycles, receiving configuration settings, providing status information (e.g., online or offline, faults or errors, etc.), etc., or any combination thereof. The control box 110 may interface with an electronic device (e.g., a smartphone, tablet, any other computing or electronic device, etc.) via the wireless interface. Additionally or alternatively, the control box 110 may include a wired interface for providing cleaning operation data, completed or missed cleaning cycles, receiving configuration settings, providing status information (e.g., online or offline, faults or errors, etc.), etc., or any combination thereof. Thus, the wireless and/or wired interface may facilitate configuration of the control box 110 to control operation of the system 100 according to specified settings.

The spent cleaning solution and film debris removed from the cooking range exhaust system 101 may drain via a waste conduit 130 to a waste reservoir 116, which may be emptied as necessary. In some examples, the waste conduit 130 may connect directly to a common drain (e.g., rather than to the waste reservoir 116) configured to receive other wastewater from the kitchen operations.

The control box 110 may control output devices, such as, solenoids, water and detergent pumps, valves, etc. The control box 110 may further monitor various input devices, such as timing sensors, timers, cancel/abort input signals, float switches, etc. In some examples, the control box 110 may include a microcontroller and a memory that is programmed with instructions to control or perform methods or operation described herein. In some examples, the control box 110 includes a programmable logic controller (PLC) configured to be programmed to control or perform methods or operations described herein.

In some examples, the control box 110 may monitor one or more float switches from a set of float switches in real time before the cleaning operation to determine how much volume of detergent from the detergent supply 112 needs to be added by a detergent pump to meet the desired detergent and water mixing ratio. The float switches may be actuated by incoming water from the water supply 114. The control box 110 may cause the detergent to be pumped from the detergent supply 112 to a reservoir attached to the control box 110. The control box 110 may select a different detergent or combination of detergents, and/or a different mixing ratio for each individual spray during the cleaning operation.

In other examples, the control box 110 may implement a post-mix operation such that a mixing ratio is controlled via a set of electronically-controlled valves to meter the water supply and the detergent supply 112 such that they are mixed at the point they enter the conduit 120 according to a target mixing ratio. The control box 110 may control the set of valves to independently set a mixing ratio for each individual zone.

In some examples, the control box 110 initiates a cleaning operation on a zone-by-zone basis. In some examples, the control box 110 is limited to causing one zone to be cleaned at a time, with one or more of the zones cleaned sequentially. That is, once a cleaning operation with one zone is complete, the control box 110 may initiate a cleaning operation on a second zone according to a cleaning schedule, and once the cleaning operation for the second zone complete, a cleaning operation for a third zone (if applicable) may be initiated. The process may continue to repeat for fourth, fifth, etc. zones. The control 110 may support programming to clean any number of different zones of a cooking range exhaust system 101, such as 4, 5, 6, 7, 8, or more zones. In other examples, two or more zones may be cleaned contemporaneously. In some examples, two zones with common target detergent-to-water ratios may be cleaned contemporaneously. A determination of a number of zones capable of being cleaned contemporaneously may be based available supply water volume and pressure, pump capacity, duration of the cleaning operation, and cleaning solution (e.g., water and detergent mixture) volume and pressure for selected zones.

The respective cleaning operation for each zone may be individually configured independent of other zones. For example, for a single cleaning operation of a particular zone, the control box may be programmed to specify number of spray cycles, a duration of each spray cycle, a detergent or combination of detergents, a mixing ratio of the selected detergent or combination of detergents and/or water, a number of and duration of each water rinse spray cycle, or any combination thereof. The control box 110 may be further programmed to specify a schedule for a particular cleaning operation in each zone, such as specifying performance of cleaning operations on specific days, excluding cleaning operation on specific days, scheduling cleaning operations after a set number of days or weeks, etc., or any combination thereof.

In some examples, the system 100 may include sensors (e.g., cameras or other sensors) (not shown) capable of detecting the film on the surfaces of the cooking range exhaust system 101. In some examples, the control box 110 may periodically receive data from the sensors indicating a level of film deposit, and may determine whether to schedule a cleaning operation based on the data. In some examples, rather than being purely time-based, the control box 110 may end a cleaning operation in response to data from the sensors indicating that the surfaces of the cooking range exhaust system 101 are sufficiently clean. In some examples, the control box 110 may determine whether a completed cleaning operation was successful based on the data from the sensors. In some examples, the control box 110 may provide the sensor data to a backend system to be analyzed and stored.

The control box 110 may be configured to provide data related to operation of the system 100, such as cycles completed, cycle duration, amount of detergent used, sensed film deposit data, etc., or any combination thereof. The information may be stored in a database. The database may also include inspection data that indicates whether the cleaning operations are meeting expected standards. The database may provide alerts if cleaning operations need to be adjusted for not meeting expected standards. The database may also provide alerts if received data indicates that operation of a particular automated cooking range exhaust cleaning system is not as expected, such as missing scheduled cleaning operations, duration of an operation is not as expected, more or less detergent is being used than expected, etc., or any combination thereof.

It is appreciated that the system 100 and the cooking range exhaust system 101 are exemplary, and that the components of the system 100 and/or the cooking range exhaust system 101 may be arranged differently, or may include fewer or additional components, without departing from the scope of the disclosure.

Figure 2:
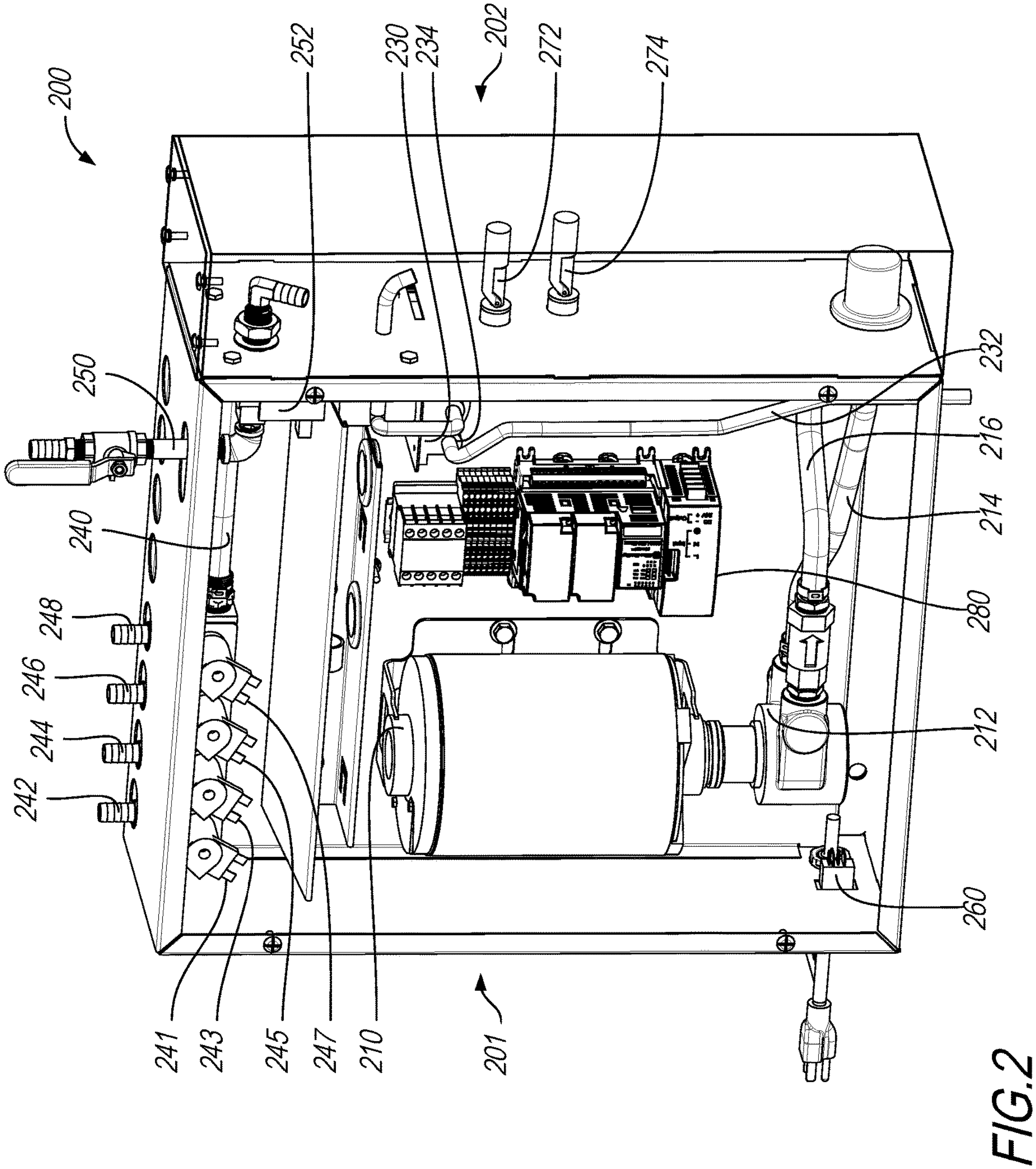
FIG. 2 depicts a diagrams illustrating an exemplary control box for an automated range exhaust cleaning system configured to clean deposited film from surfaces of a range exhaust system in accordance with embodiments of the disclosure.

FIG. 2 depicts a diagrams illustrating an exemplary control box 200 for an automated range exhaust cleaning system configured to clean deposited film from surfaces of a range exhaust system in accordance with embodiments of the disclosure. The control box 200 may be implemented in the control box 110 of FIGS. 1A-1C, in some examples, The control box 200 may receive power via a power supply connector 260 and may include a controller 280 to control operation of components of the control box 200. The controller 280 may include a microcontroller and memory, PLC controllers, field-programmable gate arrays, application-specific integrated circuits, or any combination thereof, that are capable of being programmed to perform operations described herein. The controller 280 may include various modules, circuits, sets of instructions, etc. to perform various operations described herein, such as a power supply, a spray scheduler, a valve controller, a pump controller, a mixing valve controller, a float switch monitor, timers, etc. In some examples, the controller 280 may include a memory configured to store executable instructions, and a processor or processing circuitry configured to execute the executable instructions to perform operations described herein.

In some examples, the controller 280 may include hardware and/or software configured enable connectivity to external devices and/or applications to perform various operations or functions, such as updating, monitoring, controlling, or any combination thereof. In some examples, the controller 280 may be configured to directly connect to an external computing device (e.g., a computer, a handheld device, a tablet, a smart phone, or any combination thereof). The direct connection may be via a physical connector or port (e.g., a universal serial bus (USB) port, a micro USB port, a serial port, an Ethernet port, or any other type of connectivity port) In other examples, the direct connection may be a wireless direct connection, such BlueTooth®, ZigBee®, Z-Wave®, near-field communication, and/or any other type of direct communication. In some examples, the controller 280 may be configured to communicate over a network, including a cellular network, a local area network, a wide-area network, or any combinations thereof. In some examples, the controller 280 may utilize the connectivity to provide various notifications, such as missed, interrupted, completed, etc., cleaning cycles; failure or fault information; notification of low detergent; notification of a full waste reservoir, etc. The controller 280 may further utilize the connectivity to provide cleaning cycle data, such as cycle duration for each zone, type(s) or amount of detergent used, mixing ratio, etc. The controller 280 may further utilize the connectivity to receive schedule module updates, cleaning cycle changes (e.g., mixing ratios, durations, etc. for each zone), to respond to requests for data, etc.

The control box 200 may include a control systems portion 201 and a reservoir 202. The control box 200 may include a water supply valve 252 connected to a water supply line 250. The controller 280 may be configured to control the water supply valve 252 to fill the reservoir 202 in preparation for a cleaning operation. The controller 280 may be configured to monitor float switches 272 and 274 in the controller 280 to determine when the reservoir 202 is sufficiently filled. The controller 280 may determine an amount of water held in the reservoir 202 based on a capacity of the reservoir 202, a time between activation of the float switches 272 and 274, or combinations thereof.

The control box 200 may also include one or more detergent pumps 230 configured to pump detergent received via a respective inlet 232 to the reservoir 202 via a respective outlet 234. While only one detergent pump 230 is shown, it is appreciated that the control box 200 may be configured with additional detergent pumps configured to pump different selected detergents depending on a cleaning application without departing from the scope of the disclosure. The respective detergent pumped via the one or more detergent pumps 230 into the reservoir 202 may mix with the water in the reservoir 202 to form a cleaning solution. The controller 280 may control the detergent pump 230 to pump (e.g., control a speed of the pump, length of time the pump is activated, or combinations thereof) to achieve the target detergent-to-water ratio. In some examples, the detergent-to-water ratio may range from 100% detergent (e.g., deep clean or waste conduit or drain flush) to 100% water (e.g., system rinse or flush).

The controller 280 may be configured to control a motor 210 connected to a pump 212 to pump the cleaning solution (e.g., or water if not detergent is added to the reservoir 202) from the reservoir 202 via an inlet 214 to a supply line 240 via an outlet 216. The control box 200 further includes valves 241, 243, 245, and 247 coupled to the supply line 240. The controller 280 may control the valves 241, 243, 245, and 247 to provide the cleaning solution (e.g., water and detergent mixture) from the reservoir 202 to outlet ports 242, 244, 246, and 248, respectively. The valves 241, 243, 245, and 247 may include solenoids or some other mechanism configured to receive electrical signals from the controller 280 to control positions of the valves 241, 243, 245, and 247. The ports 242, 244, 246, and 248 may each be coupled to a different respective cleaning zone or application (e.g., cleaning waste conduit or drain lines).

The arrangement of components in the control box 200 depicted in FIG. 2 is exemplary. A different arrangement of components may be implemented without departing from the scope of the disclosure. In addition, additional or fewer parts may be included without departing from the scope of the disclosure. The control box 200 may be configured to perform operations of the control box 110 as described with reference to FIGS. 1A-1C. In some examples, rather than premixing the detergent and the water in the reservoir 202, the control box 200 may include a post-mixing application whereby the pump 212 and the detergent pump 230 are both coupled directly to the supply line 240, and the controller 280 is configured to cause the pump 212 and the detergent pump 230 to operate contemporaneously to pump water and detergent, respectively, to the supply line 240 such that it is mixed in the supply line 240.

Figure 3:
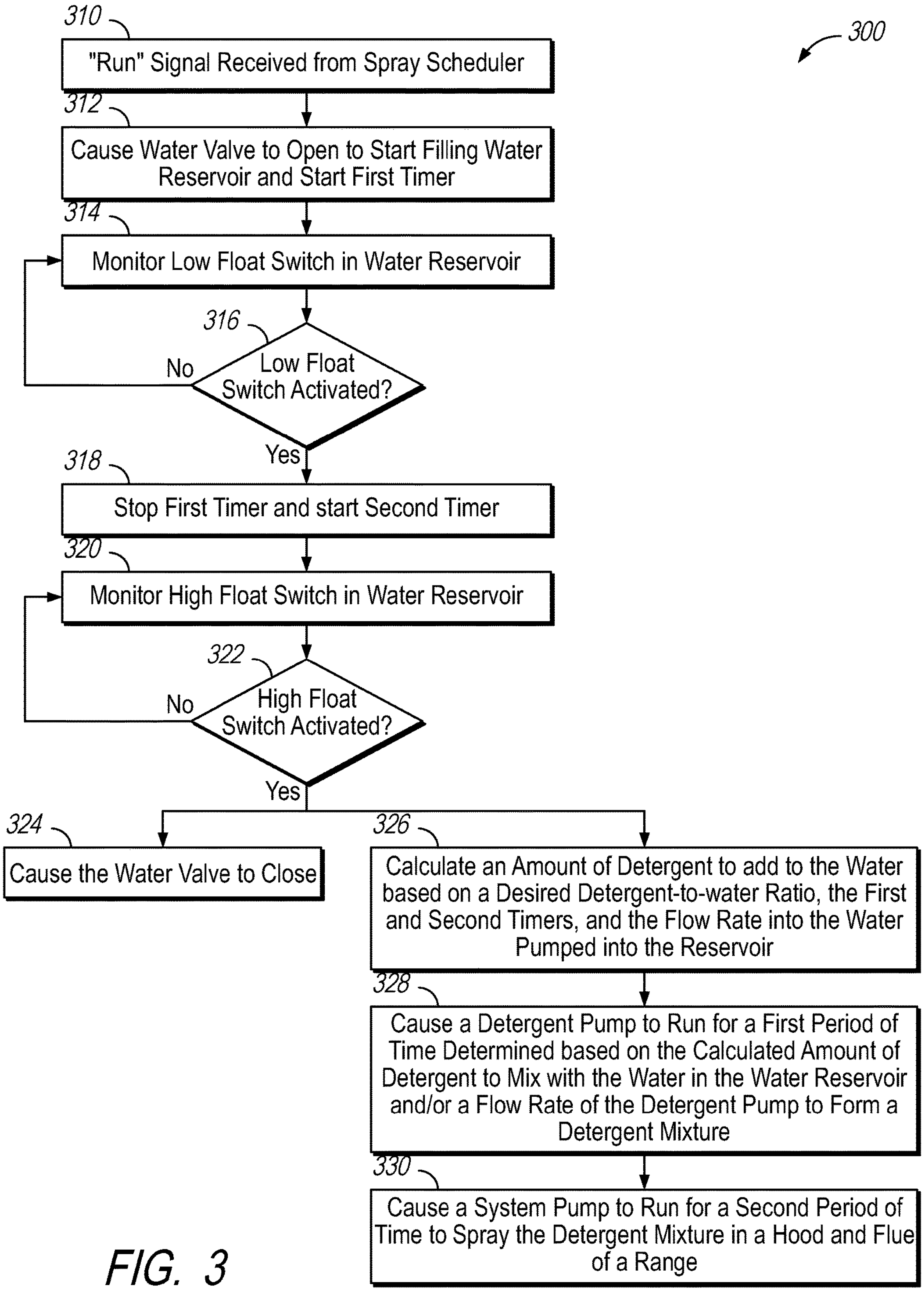
FIG. 3 is an exemplary flowchart of a method for performing a cleaning operation via an automated range exhaust cleaning system in accordance with embodiments of the present disclosure.

FIG. 3 is an exemplary flowchart of a method 300 for performing a cleaning operation via an automated range exhaust cleaning system in accordance with embodiments of the present disclosure. The method 300 may be performed by the control box 110 of FIGS. 1A-1C, the control box 200 of FIG. 2, or combinations thereof.

The method 300 may include receiving a run signal from a spray scheduler, at 310. The spray scheduler may be an application hosted on another device that is connected to the control box wirelessly or via a wired connection. In other examples, the spray scheduler is a module stored at the control box that maintains scheduling information for cleaning operations for the one or more zones of the cooking range exhaust system. In other examples, the method 300 may include receiving a run signal from a module configured to determine whether a film on the surfaces of the cooking range exhaust system exceeds a threshold based on data from one or more sensors or cameras.

The method 300 may further include causing a water valve to open to start filling a water reservoir and start a first timer, at 312. The method 300 may further include monitoring a low float switch (e.g., the float switch 274 of FIG. 2) in the water reservoir (e.g., the reservoir 202 of FIG. 2), at 314. The method 300 may further include determining whether the low float switch is activated, at 316. In response to a determination that the low float switch remains inactive, the method 300 may further include continuing to monitor the low float switch in the water reservoir, at 314. In response to a determination that the low float switch is activated, the method 300 may further include stopping the first timer and starting a second timer, at 318.

The method 300 may further include monitoring a high float switch (e.g., the float switch 272 of FIG. 2) in the water reservoir, at 320. The method 300 may further include determining whether the high float switch is activated, at 322. In response to a determination that the high float switch remains inactive, the method 300 may further include continuing to monitor the high float switch in the water reservoir, at 320.

In response to a determination that the low float switch is activated, the method 300 may further include causing the water valve to close, at 324, and calculating an amount of detergent to add to the water based on a target detergent-to-water ratio, the first and second timers, and a flow rate of the water pumped into the reservoir, at 326. The method 300 may further include causing the detergent pump to run for a first period of time determined based on the calculated amount of detergent to mix with the water in the water reservoir and/or a flow rate of the detergent pump to form a detergent mixture, at 328. The method 300 may further include causing a system pump to run for a second period of time to cause the detergent to be provided to target nozzles for spraying the detergent and water solution in some or all of a range exhaust system, at 330. The range exhaust system may include the cooking range exhaust system 101 of FIGS. 1A-1C, in some examples. The target nozzles may include nozzles coupled to the conduit 120 of FIGS. 1A-1C.

In some examples, the method 300 may further include filling the reservoir with just water, can cause the water to be provided to the target nozzles to rinse the detergent from the cooking range exhaust system. In some examples, the method 300 may be performed multiple times for a single cleaning operation may (e.g., multiple cycles of detergent spray and/or rinse), with the water reservoir refilled for each detergent or water application.

In some examples, the method 300 may further include determining whether the surfaces of the cooking range exhaust system are sufficiently clean via cameras or other sensors. In some examples, the method 300 may further include providing data related to the cleaning operation to a database configured to log cleaning operation activity.

In some examples, the method 300 may be stored as executable instructions in memory or other computer-readable medium of a controller (e.g., the controller 280 of FIG. 2) of the control box. The executable instructions may be executed by a processor or processing circuitry to perform the method 300, in some examples.

Figure 4A:
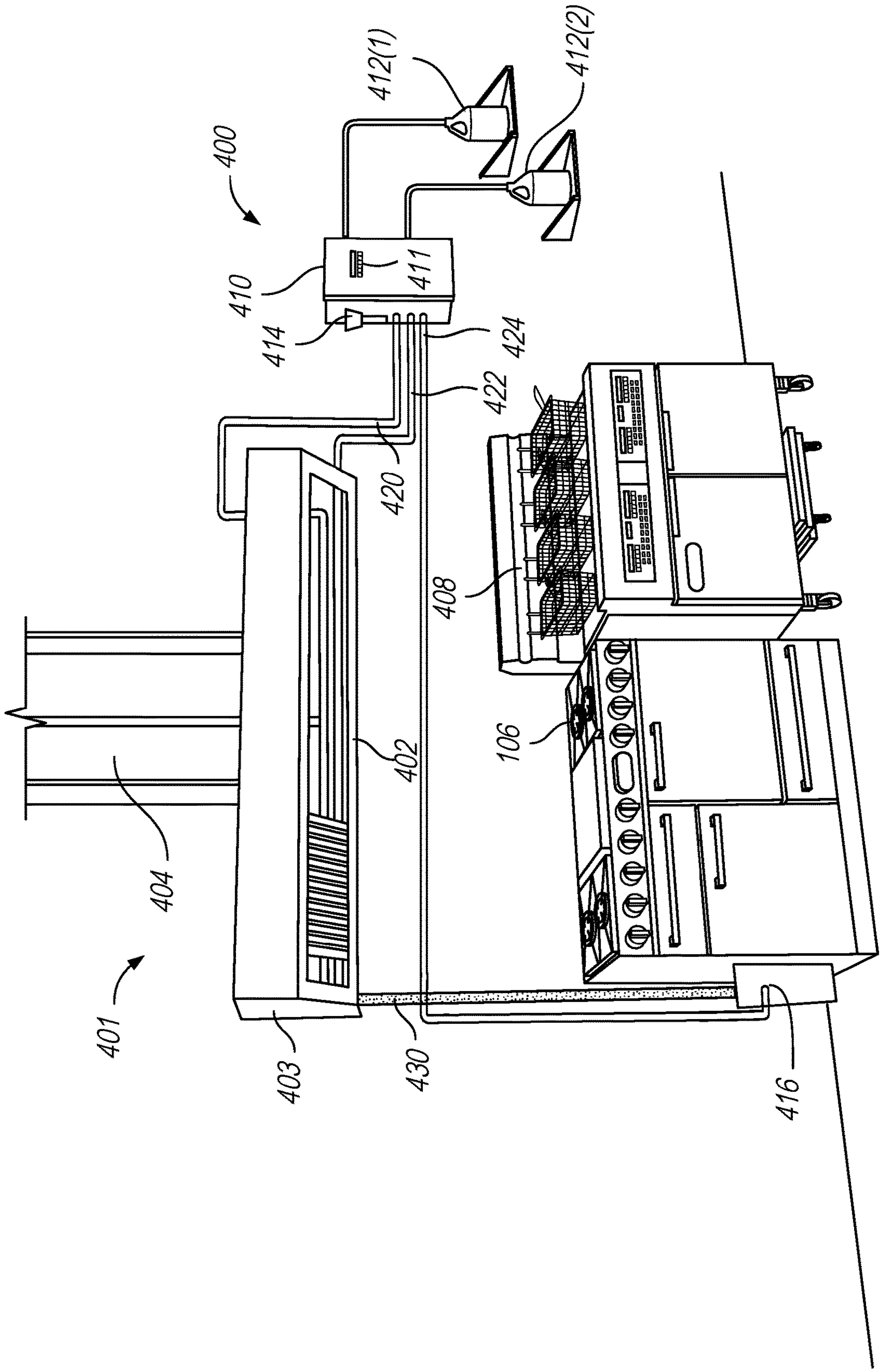
FIGS. 4A-4C depict a diagrams illustrating an exemplary automated kitchen cleaning system configured to clean deposited film/build-up from surfaces of a cooking range exhaust system, a waste conduit, and/or a drain or waste reservoir in accordance with embodiments of the disclosure.
Figure 4B:
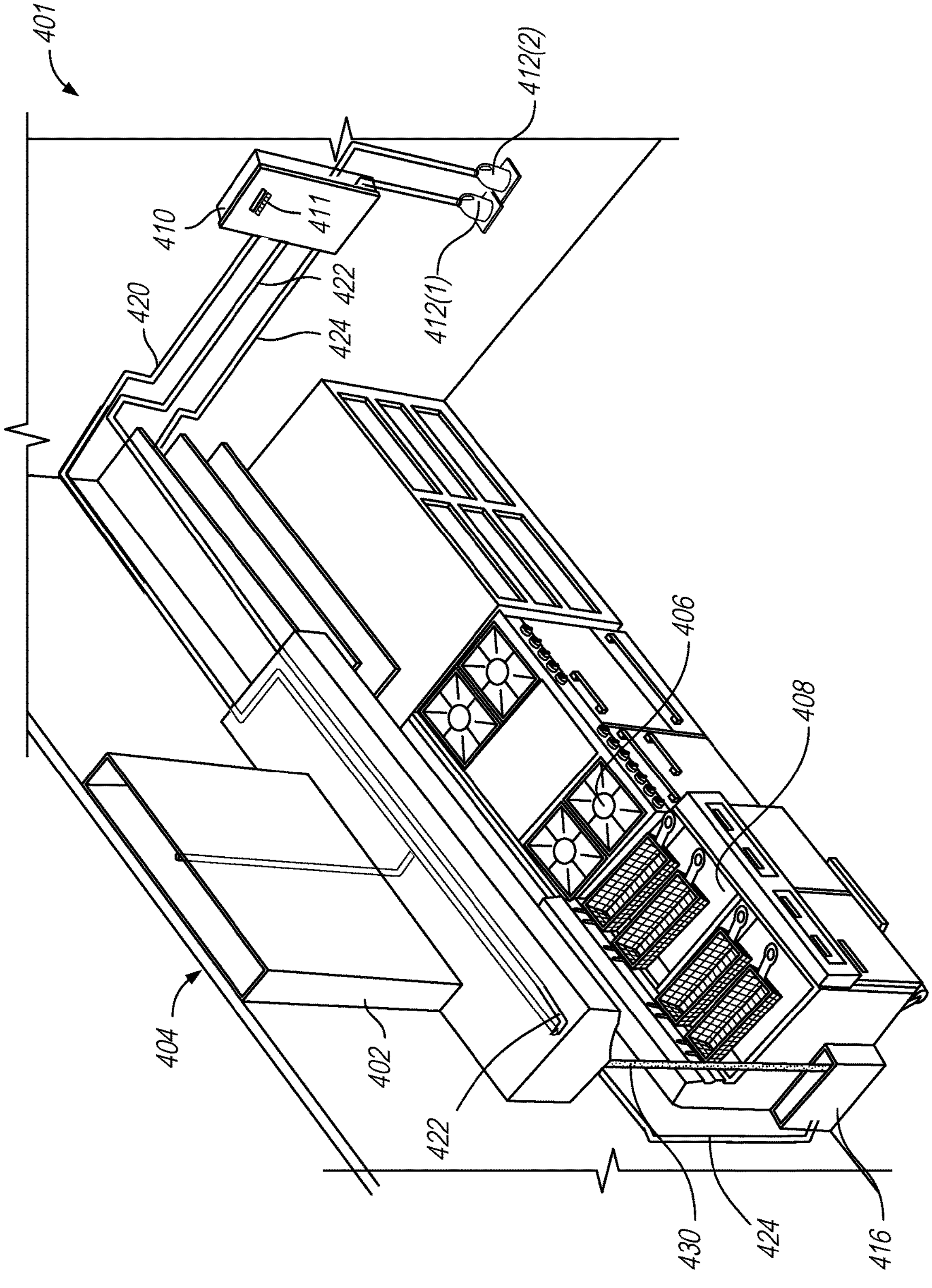
Figure 4C:
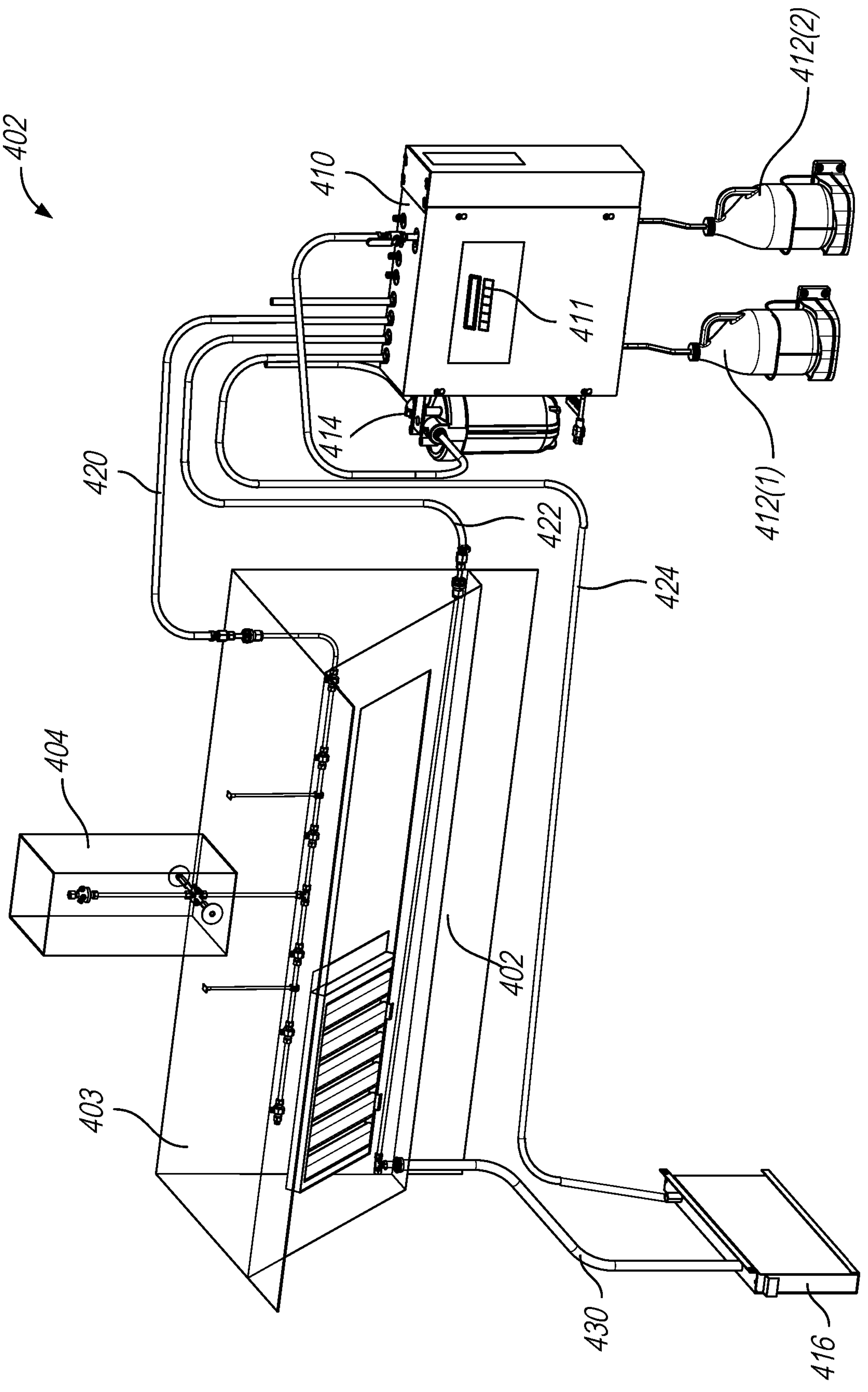

FIGS. 4A-4C depict a diagrams illustrating an exemplary automated kitchen cleaning system 400 configured to clean deposited film/build-up from surfaces of a cooking range exhaust system 401 (e.g., including a backsplash 402, a hood 403, a flue 404, and any connecting pipes or conduit), a waste conduit 430, and/or a drain or waste reservoir 416 in accordance with embodiments of the disclosure. The system 400 includes a control box 410, detergent supplies 412(1)-(2), a water supply inlet 414, a waste reservoir 416, and conduit 420. The cooking range exhaust system 401 may remove or exhaust cooking effluent (e.g., smoke, odors, grease, other types of cooking effluent, etc.) away from a cooking range 406 and/or a 408. The control box 410 may implement the control box 200 of FIG. 2, in some examples.

Over time, grease and other particles that are entrained in the exhaust effluent may be deposited on the surfaces of the backsplash 402, the hood 403, the flue 404, etc. to form a film. Similar build-up may occur in the waste conduit 430 and/or the drain or waste reservoir 416 resulting from use and/or previous cleaning cycles.

The system 400 may be configured to automatically clean the film from the cooking range exhaust system 401, the waste conduit 430, and or the drain or waste reservoir 416 which may include application of a degreasing solution provided via one or more of the detergent supplies 412(1)-(2). While only two of the detergent supplies 412(1)-(2), it is appreciated that the kitchen cleaning system 400 may be adapted to accommodate more than two different detergent supplies.

In some examples, the system 400 may be selectively configured to clean one or more of the inside surfaces of the cooking range exhaust system 401 (e.g., inside of the hood 403 and the flue 404, but not the outside of the hood 403 or the flue 404, filters; or the backsplash 402), the waste conduit 430, and/or the drain or waste reservoir 416.

In some embodiments, to clean the cooking range exhaust system 401, the system 400 includes a spray system with conduit 420 disposed in, on, or proximate to parts of the cooking range exhaust system 401, the hood 403 and/or the flue 404, and may be arranged to spray surfaces with a detergent solution and/or water. In some examples, the conduit 420 may include two or more zones of independently activated or controlled groups of nozzles. In some examples, the zones may each have an independent set of pipes. In other examples, the zones may share some pipes with other zones, yet the nozzles are independently activated or controlled.

In some embodiments, the system 400 may empty into a floor drain (e.g., common drain) 416 or into a waste reservoir 416 via a waste conduit 430. Over time, the drain or waste reservoir 416 and/or the waste conduit 430 may become clogged with grease and other materials removed during cleaning cycles. Thus, these elements of the system 400 may also need to undergo cleaning to flush out those lines. In some embodiments, to clean the waste conduit 430, the system 400 includes a conduit 422 configured to carry detergent and/or water to the waste conduit 430. In some examples, the conduit may tap into a side of the waste conduit 430. In other examples, the conduit 422 may empty into an opening at a top of the waste conduit 430.

In some embodiments, to clean the drain or waste reservoir 416, the system 400 includes a conduit 422 configured to carry detergent and/or water to the waste conduit 430. In some examples, the conduit may tap into a side of the waste conduit 430. In other examples, the conduit 422 may empty into an opening at a top of the waste conduit 430.

In some examples, the drain or waste reservoir 416 and/or the waste conduit 430 may undergo less frequent cleaning cycles than the cooking range exhaust system 401. In some examples, cleaning of the drain or waste reservoir 416 and/or the waste conduit 430 may utilize different types and/or different concentrations of detergents selected from the detergent supplies 412(1)-(2) than the cooking range exhaust system 401. In some examples, the conduit 422 and/or the conduit 424 may be larger and capable of carrying a higher volume of water than the conduit 420.

The control box 410 may be configured to control operation of the system 400, including cleaning operation parameters or configurations for individual zones of the conduit 420, the conduit 422, and/or the conduit 424. The control box 410 may receive water at a water supply inlet 414. The water supply inlet 414 may include a filter to filter the supply water prior to entering the system 400. The control box 410 may also receive detergent from one or more of the detergent supplies 412(1)-(2). The control box 410 may be programmed to control, on a zone-by-zone basis, scheduling cleaning operations (e.g., frequency and times), a duration of a cleaning cycle, detergent-to-water ratios, number of spray or flush cycles per cleaning operation, duration of individual spray or flush cycles, or any combination thereof.

In some examples, the control box 410 may include a wireless interface (e.g., Wi-Fi, Bluetooth, etc.) for providing cleaning operation data, completed or missed cleaning cycles, receiving configuration settings, providing status information (e.g., online or offline, faults or errors, etc.), etc., or any combination thereof. The control box 410 may interface with an electronic device (e.g., a smartphone, tablet, any other computing or electronic device, etc.) via the wireless interface. Additionally or alternatively, the control box 410 may include a wired interface for providing cleaning operation data, completed or missed cleaning cycles, receiving configuration settings, providing status information (e.g., online or offline, faults or errors, etc.), etc., or any combination thereof. Thus, the wireless and/or wired interface may facilitate configuration of the control box 410 to control operation of the system 400 according to specified settings.

As previously described, the spent cleaning solution and film debris removed from the cooking range exhaust system 401 may drain via the waste conduit 430 to the drain or waste reservoir 416. In examples where the drain or waste reservoir 416 is a waste reservoir, the waste reservoir may be emptied as necessary. In some examples, where the waste conduit 430 empties directly to a drain (e.g., rather than to the waste reservoir 416), the drain may also be configured to receive other wastewater from other the kitchen operations.

The control box 410 may control output devices, such as, solenoids, water and detergent pumps, valves, etc. The control box 410 may further monitor various input devices, such as timing sensors, timers, cancel/abort input signals, float switches, etc. In some examples, the control box 410 may include a microcontroller and a memory that is programmed with instructions to control or perform methods or operation described herein. In some examples, the control box 410 includes a programmable logic controller (PLC) configured to be programmed to control or perform methods or operations described herein.

In some examples, the control box 410 may monitor one or more float switches from a set of float switches in real time before the cleaning operation to determine how much volume of detergent from the detergent supply 412 needs to be added by a detergent pump to meet the desired detergent and water mixing ratio. The float switches may be actuated by incoming water from the water supply 414. The control box 410 may cause the detergent to be pumped from the detergent supply 412 to a reservoir attached to the control box 410. The control box 410 may select different a detergent or combination of detergents, and a different mixing ratio of the selected detergent or combination of detergents and/or water for each individual spray during the cleaning operation.

In other examples, the control box 410 may implement a post-mix operation such that a mixing ratio is controlled via a set of electronically-controlled valves to meter the water supply and one or more of the detergent supplies 412(1)-(2) such that they are mixed at the point they enter the conduit 420 according to a target mixing ratio. The control box 410 may control the set of valves to independently set a mixing ratio for each individual zone.

In some examples, the control box 410 initiates a cleaning operation on a zone-by-zone basis using the conduit 420, the conduit 422, and/or the conduit 424. In some examples, the control box 410 is limited to causing one zone to be cleaned at a time, with one or more of the zones cleaned sequentially. That is, once a cleaning operation with one zone is complete, the control box 410 may initiate a cleaning operation on a second zone according to a cleaning schedule, and once the cleaning operation for the second zone complete, a cleaning operation for a third zone (if applicable) may be initiated. The process may continue to repeat for fourth, fifth, etc. zones. The control 410 may support programming to clean any number of different zones of a cooking range exhaust system 401, such as 4, 5, 6, 7, 8, or more zones. In other examples, two or more zones may be cleaned contemporaneously. In some examples, two zones with common target detergent-to-water ratios may be cleaned contemporaneously. A determination of a number of zones capable of being cleaned contemporaneously may be based available supply water volume and pressure, pump capacity, duration of the cleaning operation, and cleaning solution (e.g., water and detergent mixture) volume and pressure for selected zones. In some examples, cleaning of the waste conduit 430 and/or the drain or waste reservoir 416 may be performed less frequently than cleaning of the exhaust system, and may constitute more of a flush than a spray application The respective cleaning operation for each zone may be individually configured independent of other zones. For example, for a single cleaning operation of a particular zone, the control box may be programmed to specify number of spray or flush cycles, a duration of each spray or flush cycle, a detergent or combination of detergents, a mixing ratio of the selected detergent or combination of detergents and/or water, a number of and duration of each water rinse spray cycle, or any combination thereof. The control box 410 may be further programmed to specify a schedule for a particular cleaning operation in each zone, such as specifying performance of cleaning operations on specific days, excluding cleaning operation on specific days, scheduling cleaning operations after a set number of days or weeks, etc., or any combination thereof.

In some examples, the system 400 may include sensors (e.g., cameras or other sensors) (not shown) capable of detecting the film on the surfaces of the cooking range exhaust system 401. In some examples, the control box 410 may periodically receive data from the sensors indicating a level of film deposit, and may determine whether to schedule a cleaning operation based on the data. In some examples, rather than being purely time-based, the control box 410 may end a cleaning operation in response to data from the sensors indicating that the surfaces of the cooking range exhaust system 401 are sufficiently clean. In some examples, the control box 410 may determine whether a completed cleaning operation was successful based on the data from the sensors. In some examples, the control box 410 may provide the sensor data to a backend system to be analyzed and stored.

In some examples, the control box 410 may further include other sensors configured to detect an empty one of the detergent supplies 412(1)-(2) (e.g., based on characteristics of the detergent pump operation and/or pressure or flow sensors in the detergent lines), a lack of a water supply (e.g., pressure or flow sensors in the water supply inlet 414), water supply quality, whether one of the conduits 420, 422, and/or 424 and/or corresponding spray nozzles are clogged, etc. In some examples, the control box 410 may include a display, lights, and/or a speaker 411 to provide visual and/or aural alerts to a user (e.g., customer, technician, etc.) that there is a problem with the system, such as one of the detergent supplies 412(1)-(2) being low or empty, lack of water supply from the water supply inlet 414, one of the conduits 420, 422, and/or 424 and/or corresponding spray nozzles are clogged, etc.

The control box 410 may be configured to provide data related to operation of the system 400, such as cycles completed, cycle duration, amount of detergent used, sensed film deposit data, etc., or any combination thereof. The information may be stored in a database. The database may also include inspection data that indicates whether the cleaning operations are meeting expected standards. The database may be used to provide alerts if cleaning operations need to be adjusted for not meeting expected standards. The database may also be used to provide alerts if received data indicates that operation of a particular automated cooking range exhaust cleaning system is not as expected, such as missing scheduled cleaning operations, duration of an operation is not as expected, more or less detergent is being used than expected, etc., or any combination thereof. In addition to the alerts provided by the display, lights, and/or a speaker 411, database may also be used to provide alerts to users (e.g., customers, technicians, etc.) if received data indicates a problem with the system, such as one of the detergent supplies 412(1)-(2) being low or empty, lack of water supply from the water supply inlet 414, one of the conduits 420, 422, and/or 424 and/or corresponding spray nozzles are clogged, the system is not as cleaning as expected (e.g., missing scheduled cleaning operations, duration of an operation is not as expected, more or less detergent is being used than expected, etc.), or any combination thereof.

It is appreciated that the system 400 and the cooking range exhaust system 401 are exemplary, and that the components of the system 400 and/or the cooking range exhaust system 401 may be arranged differently, or may include fewer or additional components, without departing from the scope of the disclosure.

Various illustrative components, blocks, configurations, modules, and steps have been described above generally in terms of their functionality. Persons having ordinary skill in the art may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

What is claimed is:

1. A system, comprising:

a plurality of nozzles coupled to a hood conduit and arranged to spray at least a hood zone of a cooking range exhaust system with a first cleaning solution;

a waste conduit configured to receive the sprayed first cleaning solution from the hood zone as runoff and provide the runoff from the cooking range exhaust system to a drain;

a waste conduit cleaning conduit arranged downstream of the plurality of nozzles and configured to dispense a second cleaning solution into the waste conduit; and a control box configured to:

in response to receipt of a first start signal to initiate a first cleaning operation of the cooking range exhaust system:

cause the first cleaning solution comprising a mixture of a first detergent and water having a ratio based on a first target mixing ratio to be mixed in a reservoir at the first target mixing ratio to form the first cleaning solution;

monitor a float switch in the reservoir;

cause a first electronically-controlled valve to open upon actuation of the float switch thereby indicating the first target mixing ratio has been reached; and cause the first cleaning solution to be provided to the plurality of nozzles via the hood conduit; and in response to receipt of a second start signal to initiate a second cleaning operation of the waste conduit:

cause the second cleaning solution comprising a mixture of a second detergent and water having a ratio based on a second target mixing ratio to be mixed in the reservoir at the second target mixing ratio to form the second cleaning solution;

monitor the float switch in the reservoir;

cause a second electronically-controlled valve to open upon actuation of the float switch thereby indicating the second target mixing ratio has been reached; and cause the second cleaning solution to be dispensed into the waste conduit via the waste conduit cleaning conduit.

2. The system of claim 1, wherein;

the waste conduit is configured to provide the runoff from the cooking range exhaust system to the drain arranged downstream of the waste conduit;

the waste conduit cleaning conduit is arranged downstream of the hood conduit and the plurality of nozzles; and the control box is further configured to:

in response to receipt of the first start signal, cause the first cleaning solution to be provided to the plurality of nozzles via the hood conduit such that the first cleaning solution cleans at least the hood zone; and in response to receipt of the second start signal, cause the second cleaning solution to be dispensed into the waste conduit via the waste conduit cleaning conduit such that the second cleaning solution cleans at least the waste conduit.

3. The system of claim 1, wherein the second cleaning solution further includes a third detergent.

4. The system of claim 1, wherein the first detergent is different than the second detergent, the first target mixing ratio is different than the second target mixing ratio, or both.

5. The system of claim 1, wherein the control box is further configured to provide an alert in response to detection that a supply for the first or for the second detergent is low or empty.

6. The system of claim 5, wherein the control box comprises at least one of a display, a light, or a speaker configured to provide the alert.

7. The system of claim 1, wherein the control box is further configured to provide an alert in response to detection that a supply for the water is unavailable.

8. The system of claim 1, wherein the control box further comprises a wired or wireless interface configured to provide data corresponding to the first cleaning operation or the second cleaning operation to a remote device.

9. A system, comprising:

a first nozzle coupled to a hood conduit and arranged to spray a hood zone of a cooking range exhaust system with a first cleaning solution;

a second nozzle coupled to a flue conduit and arranged to spray a flue zone of the cooking range exhaust system with a second cleaning solution;

a waste conduit of the cooking range exhaust system, the waste conduit configured to receive runoff from the hood zone and the flue zone;

a third nozzle coupled to a waste conduit cleaning conduit and arranged to spray the waste conduit with a third cleaning solution; and a control box configured to:

in response to receipt of a first start signal to initiate a first cleaning operation of the cooking range exhaust system, determine actuation of a float switch corresponding to the first cleaning solution being mixed to a first target mixing ratio, cause a first valve to open to cause the first cleaning solution at the first target mixing ratio to be provided to the first nozzle via the hood conduit;

in response to receipt of a second start signal to initiate a second cleaning operation of the cooking range exhaust system, determine actuation of a float switch corresponding to the second cleaning solution being mixed to a second target mixing ratio, cause a second valve to open to cause the second cleaning solution at the second target mixing ratio to be provided to the second nozzle via the flue conduit; and in response to receipt of a third start signal to initiate a third cleaning operation of the cooking range exhaust system, determine actuation of a float switch corresponding to the third cleaning solution being mixed to a third target mixing ratio, cause a third valve to open to cause the third cleaning solution at the third target mixing ratio to be provided to the third nozzle via the waste conduit cleaning conduit.

10. The system of claim 9, wherein the control box is further configured to:

in response to receipt of the first start signal to initiate the first cleaning operation, cause a first detergent and water to be mixed in a reservoir at the first target mixing ratio to form the first cleaning solution;

in response to receipt of the second start signal to initiate the second cleaning operation, cause a second detergent and water to be mixed in the reservoir at the second target mixing ratio to form the second cleaning solution; and in response to receipt of the third start signal to initiate the third cleaning operation, cause a third detergent and water to be mixed in the reservoir at the third target mixing ratio to form the third cleaning solution.

11. The system of claim 10, wherein the third cleaning solution further includes a fourth detergent.

12. The system of claim 10, wherein the first detergent is different than the third detergent and the second detergent is different than the third detergent.

13. The system of claim 10, wherein the control box is further configured to provide an alert in response to detection that a supply for the first, second, or for the third detergent is low or empty.

14. The system of claim 13, wherein the control box comprises at least one of a display, a light, or a speaker configured to provide the alert.

15. The system of claim 10, wherein the control box is further configured to provide an alert in response to detection that a supply for the water is unavailable.

16. The system of claim 9, wherein:

the waste conduit is configured to provide the runoff from the cooking range exhaust system to a drain arranged downstream of the waste conduit;

the waste conduit cleaning conduit is arranged downstream of the first nozzle of the hood conduit and the second nozzle of the flue conduit; and the control box is further configured to:

in response to receipt of the first start signal, cause the first cleaning solution to be provided to the first nozzle via the hood conduit such that the first cleaning solution cleans at least the hood zone;

in response to receipt of the second start signal, cause the second cleaning solution to be provided to the second nozzle via the flue conduit such that the second cleaning solution cleans at least the flue zone; and in response to receipt of the third start signal, cause the third cleaning solution to be dispensed into the third nozzle via the waste conduit cleaning conduit such that the third cleaning solution cleans at least the waste conduit.

17. The system of claim 9, wherein the control box further comprises a wired or wireless interface configured to provide data corresponding to the first cleaning operation, the second cleaning operation, or the third cleaning operation to a remote device.

18. A system, comprising:

a first nozzle coupled to a first conduit and arranged to spray at least a first zone of a cooking range exhaust system with a first cleaning solution;

a waste conduit configured to receive the sprayed first cleaning solution from the first zone as runoff and provide the runoff from the cooking range exhaust system to a drain or reservoir;

a second nozzle coupled to a waste conduit cleaning conduit configured to dispense a second cleaning solution into the waste conduit, wherein the second nozzle directs spray into the waste conduit; and a control box configured to:

in response to receipt of a first start signal, cause the first cleaning solution comprising a detergent and water to be provided to the first nozzle through the first conduit by opening a first valve to provide water to the first conduit and opening a second valve to provide the detergent to the first conduit in a first ratio such that the water and the detergent are mixed upon entering the first conduit; and in response to receipt of a second start signal, cause the second cleaning solution comprising the detergent and water to be provided to the second nozzle through the waste conduit cleaning conduit by opening the first valve to provide water to the waste conduit cleaning conduit and opening the second valve to provide the detergent to the waste conduit cleaning conduit such that the water and the detergent are mixed upon entering the waste conduit cleaning conduit.

19. The system of claim 18, wherein the second nozzle directs spray into a side of the waste conduit.

20. The system of claim 18, wherein the second nozzle directs spray into an opening at a top of the waste conduit.

21. The system of claim 18, wherein:

the waste conduit is configured to provide the runoff from the cooking range exhaust system to the drain or reservoir arranged downstream of the waste conduit;

the waste conduit cleaning conduit is arranged downstream of the first nozzle and the first zone; and the control box is further configured to:

in response to receipt of the first start signal, cause the first cleaning solution to be provided to the first nozzle via the first conduit such that the first cleaning solution cleans at least the hood zone; and in response to receipt of the second start signal, cause the second cleaning solution to be dispensed into the waste conduit via the waste conduit cleaning conduit such that the second cleaning solution cleans at least the waste conduit.

22. The system of claim 18, wherein the control box is further configured to:

in response to receipt of the first start signal to initiate the first cleaning operation of the cooking range exhaust system, cause the first detergent and water to be mixed in a reservoir at the first target mixing ratio to form the first cleaning solution; and in response to receipt of the second start signal to initiate the second cleaning operation of the waste conduit, cause the second detergent and water to be mixed in the reservoir at the second target mixing ratio to form the second cleaning solution.

23. The system of claim 22, wherein the control box is configured to cause a valve to open to cause the second cleaning solution to be provided to the waste conduit via the waste conduit cleaning conduit during the second cleaning operation.

* * * * *